United States Patent
Niimi et al.

(10) Patent No.: US 8,901,874 B2
(45) Date of Patent: Dec. 2, 2014

(54) ELECTRIC POWER STEERING SYSTEM

(75) Inventors: Kozo Niimi, Kariya (JP); Yuji Kariatsumari, Yamatotakada (JP)

(73) Assignee: JTEKT Corporation, Osaka (JP)

( * ) Notice: Subject to any disclaimer, the term of this patent is extended or adjusted under 35 U.S.C. 154(b) by 111 days.

(21) Appl. No.: 13/364,453

(22) Filed: Feb. 2, 2012

(65) Prior Publication Data

US 2012/0205186 A1 Aug. 16, 2012

(30) Foreign Application Priority Data

Feb. 14, 2011 (JP) .................. 2011-028979
Oct. 14, 2011 (JP) .................. 2011-227069

(51) Int. Cl.
- *H02P 23/00* (2006.01)
- *H02P 21/00* (2006.01)
- *H02P 7/00* (2006.01)
- *B62D 5/04* (2006.01)

(52) U.S. Cl.
CPC ...................... *B62D 5/04* (2013.01)
USPC ............ 318/700; 318/400.02; 318/432

(58) Field of Classification Search
CPC ... H02P 21/0035; H02P 21/06; H02P 21/146; H02P 2207/05
USPC ................... 318/400.02, 432, 700
See application file for complete search history.

(56) References Cited

U.S. PATENT DOCUMENTS

| | | | |
|---|---|---|---|
| 7,080,711 B2* | 7/2006 | Koike et al. | 180/404 |
| 7,157,874 B2* | 1/2007 | Nomura et al. | 318/432 |
| 2003/0121716 A1* | 7/2003 | Yamada et al. | 180/446 |
| 2009/0079371 A1* | 3/2009 | Suzuki | 318/400.02 |

FOREIGN PATENT DOCUMENTS

| | | |
|---|---|---|
| DE | 197 42 370 A1 | 4/1998 |
| EP | 2 426 032 A2 | 3/2012 |
| EP | 2 448 106 A1 | 5/2012 |
| FR | 2 790 094 A1 | 8/2000 |
| JP | A-2004-066999 | 3/2004 |
| WO | WO 2010/150745 A1 | 12/2010 |

OTHER PUBLICATIONS

Jul. 31, 2014 Extended European Search Report issued in European Patent Application No. 12154716.0.

* cited by examiner

*Primary Examiner* — Eduardo Colon Santana
*Assistant Examiner* — Gabriel Agared
(74) *Attorney, Agent, or Firm* — Oliff PLC (57) ABSTRACT

An electric power steering system calculates a motor resistance Rm using a resistance map, and calculates an estimated inducted voltage based on a motor current and a motor voltage. If the estimated induced voltage is determined as being equal to or smaller than a determination value that is set in accordance with the current level, the electric power steering system calculates a motor resistance (estimated motor resistance Rma) and updates the resistance map based on the estimated motor resistance Rma.

18 Claims, 10 Drawing Sheets

(INDUCED VOLTAGE ESTIMATING PROCESS)

S210: CALCULATION OF INTERMEDIATE VARIABLE $\zeta(n)$

$$\zeta(n) = \left(1 - \frac{G_{ob} \cdot T_s}{L}\right)\zeta(n-1) + \left(\frac{G_{ob} \cdot T_s}{L}\right)\{V_m(n) + (G_{ob} - R) \cdot I_m(n)\} \quad \cdots (8)$$

S220: CALCULATION OF ESTIMATED INDUCED VOLTAGE $EX_a$ $$EX_a(n) = \zeta(n-1) - G_{ob} \cdot I_m(n) \quad \cdots (9)$$

END

FIG. 4

(MOTOR RESISTANCE CALCULATING PROCESS)

S310: CALCULATION OF AVERAGE MOTOR CURRENT $I_{ave}$ $$I_{ave} \leftarrow \frac{\sum_{n=1}^{N} I_m(n)}{N}$$

S320: CALCULATION OF AVERAGE MOTOR VOLTAGE $V_{ave}$ $$V_{ave} \leftarrow \frac{\sum_{n=1}^{N} V_m(n)}{N}$$

S330: CALCULATION OF AVERAGE MOTOR RESISTANCE $R_{ave}$ $$R_{ave} \leftarrow \frac{V_{ave}}{I_{ave}}$$

END

ELECTRIC POWER STEERING SYSTEM

INCORPORATION BY REFERENCE

The disclosures of Japanese Patent Applications No. 2011-028979 filed on Feb. 14, 2011 and No. 2011-227069 filed on Oct. 14, 2011 including the specifications, drawings and abstracts, are incorporated herein by reference in their entireties.

BACKGROUND OF THE INVENTION

1. Field of the Invention

The invention relates to an electric power steering system including a motor that applies assist force to a steering system.

2. Description of Related Art

Japanese Patent Application Publication No. 2004-66999 describes an electric power steering system that calculates a motor rotational angular velocity $\overline{\omega}$ using Equation A shown below.

$$\overline{\omega} = (Vm - R \times IM)/Ke \quad \text{Equation A}$$

In Equation A above, Vm represents the voltage between terminals of a motor (inter-terminal voltage), R represents the resistance of the motor, Im represents the current of the motor, and Ke is an induced voltage coefficient (V·s/rad). The resistance of the motor is actually measured and stored in advance.

The actual resistance of a motor changes under the influence of the motor ambient temperature. The motor resistance varies from motor to motor. Further, the motor resistance changes due to repeated use over the years.

The electric power steering system described in Japanese Patent Application Publication No. 2004-66999, however, does not address this issue. Therefore, there is a possibility of a large difference between the motor resistance actually measured and stored in advance and the actual motor resistance. Such a large motor resistance difference causes a large difference between the motor rotational angular velocity calculated based on the motor resistance and the actual motor rotational angular velocity.

SUMMARY OF THE INVENTION

It is an object of the invention to provide an electric power steering system capable of minimizing the difference between the actual resistance of a motor used to apply assist force to a steering system and the calculated resistance of the motor.

An aspect of the invention relates to an electric power steering system including a motor that applies assist force to a steering system. An induced voltage of the motor is calculated as an estimated induced voltage, based on a current of the motor and a voltage of the motor, and a resistance value of the motor, which is set for calculation, is updated when a magnitude of the estimated induced voltage is equal to or smaller than a determination value that is set in accordance with a level of the current of the motor.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A first example embodiment of the invention will be described with reference to FIGS. 1 to 8. An electric power steering system 1 includes a steering angle transfer mechanism 10, an EPS actuator unit 20, and an electronic control unit 30. The steering angle transfer mechanism 10 transfers the rotation of a steering wheel 2 to steered wheels 3. The EPS actuator unit 20 applies, to the steering angle transfer mechanism 10, the force for assisting the manual operation of the steering wheel 2 (will hereinafter be referred to as "assist force"). The electronic control unit 30 controls the EPS actuator unit 20. Further, the electric power steering system 1 includes a plurality of sensors that detect the operation states of these devices.

Figure 1:
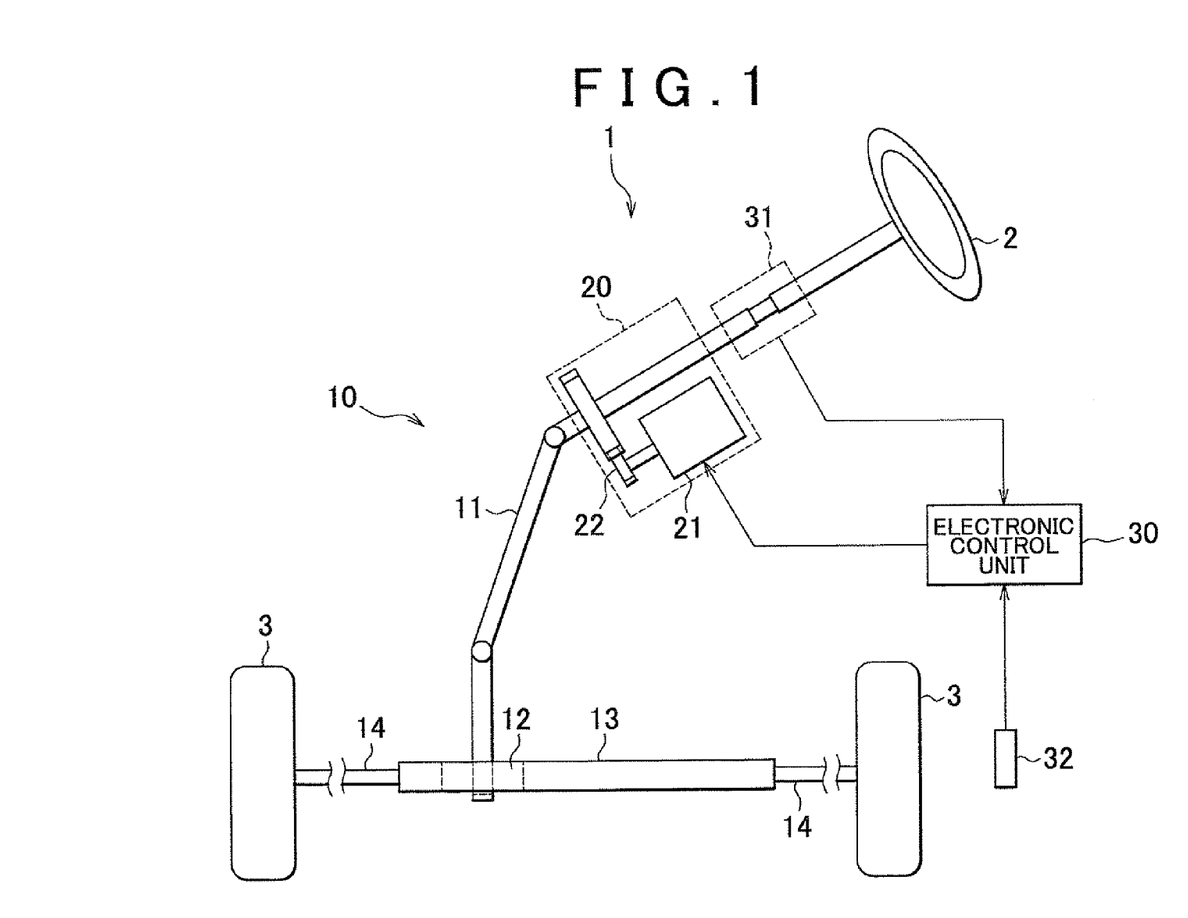
FIG. 1 is a view schematically showing the entire configuration of an electric power steering system according to a first example embodiment of the invention.

The steering angle transfer mechanism 10 includes a steering shaft 11, a rack and pinion mechanism 12, a rack shaft 13, and tie rods 14. The steering shaft 11 rotates together with the steering wheel 2. The rack and pinion mechanism 12 transfers the rotation of the steering shaft 11 to the rack shaft 13. The rack shaft 13 drives the tie rods 14. The tie rods 14 drive respective knuckles.

The EPS actuator unit 20 includes a motor 21 that applies torque to the steering shaft 11 and a reduction mechanism 22 that reduces the rotation speed of the steering shaft 11. The motor 21 is a motor with a brush (hereinafter, referred to as "brushed motor"). The rotation of the motor 21 is transferred to the steering shaft 11 after the speed of rotation is reduced by the reduction mechanism 22. The torque applied from the motor 21 to the steering shaft 11 at this time acts as the assist force described above.

The steering angle transfer mechanism 10 operates as follows. When the steering wheel 2 is manually operated, the assist force is applied to the steering shaft 11 and the steering shaft 11 rotates. The rotation of the steering shaft 11 is converted into a linear motion of the rack shaft 13 by the rack and pinion mechanism 12. The linear motion of the rack shaft 13 is transferred to the knuckles via the respective tie rods 14 connected to the respective ends of the rack shaft 13. As the knuckles are thus operated, the steering angle of the steered wheels 3 changes.

The steering angle of the steering wheel 2 is specified using the neutral position of the steering wheel 2 as a reference. More specifically, the steering angle of the steering wheel 2 is zero when the steering wheel 2 is at the neutral position, and it increases as the steering wheel 2 is turned clockwise or counterclockwise from the neutral position. The amount of an increase in the angle of the steering wheel 2 corresponds to the angle of its rotation from the neutral position.

The electric power steering system 1 includes a torque sensor 31 that detects the torque of the steering wheel 2 and a vehicle speed sensor 32 that detects the speed of the vehicle. These sensors output signals corresponding to changes in the values of their target parameters, as described below.

The torque sensor 31 outputs, to the electronic control unit 30, a signal corresponding to the level of torque applied to the steering shaft 11 from the steering wheel 2 manually operated (will hereinafter be referred to as "output signal SA"). The vehicle speed sensor 32 outputs, to the electronic control unit 30, a signal corresponding to the rotational angular velocity of the steered wheels 3 (will hereinafter be referred to as "output signal SB"). The vehicle speed sensor 32 is a set of sensors provided at the respective rear wheels.

The electronic control unit 30 calculates the following computation values based on the outputs from the respective sensors. More specifically, the electronic control unit 30 calculates, based on the output signal SA from the torque sensor 31, a computation value corresponding to the level of torque input into the steering shaft 11 from the steering wheel 2 manually operated (will hereinafter be referred to as "steering operation torque $\tau$"). The electronic control unit 30 calculates, based on the output signal SB from the vehicle speed sensor 32 (i.e., the signals corresponding to the respective rear wheels), a computation value corresponding to the speed of the vehicle (will hereinafter be referred to as "vehicle speed V").

The electronic control unit 30 executes power assist control for adjusting the assist force based on the vehicle speed V, a correction value of the steering operation torque $\tau$ (will hereinafter be referred to as "corrected steering operation torque $\tau a$"). Further, the electronic control unit 30 executes steering operation torque shift control for calculating the corrected steering operation torque $\tau a$ based on the vehicle speed V, the steering operation torque $\tau$, and the rotational angular velocity of the motor 21 (will hereinafter be refereed to as "motor rotational angular velocity $\bar{\omega}m$").

The state of operation of the steering wheel 2 is classified into three states, that is, "turning state", "neutral state", and "maintained state". More specifically, "turning state" represents the state where the steering wheel 2 is being turned, "neutral state" represents the state where the steering wheel 2 is at the neutral position, and "maintained state" represents the state where the steering wheel 2 is maintained at a position to which the steering wheel 2 has been brought as a result of being turned clockwise or counterclockwise from the natural position.

The brushed motor 21 does not have any sensor that detects the motor rotational angular velocity $\bar{\omega}m$. Therefore, the motor rotational angular velocity $\bar{\omega}m$, used in the steering operation torque shift control, is calculated using Equation 1, which is a motor equation.

$$\bar{\omega}m = (Vm - Im \times Rm)/Ke \qquad \text{Equation 1}$$

In Equation 1, Vm represents a motor voltage Vm, Im represents a motor current Im, Rm represents a motor resistance Rm, and Ke represents a counter electromotive force constant Ke of the motor 21.

The value of the counter electromotive force constant specific to the motor 21 is used as the counter electromotive force constant Ke. The counter electromotive force constant Ke is set in advance and stored in a storage portion of the electronic control unit 30. The motor resistance Rm is determined using a resistance map each time the motor rotational angular velocity $\bar{\omega}m$ is calculated. The motor voltage Vm is detected as the voltage between the terminals of the motor 21 (inter-terminal voltage). The motor current Im is detected as the current supplied to the motor 21.

Figure 8:
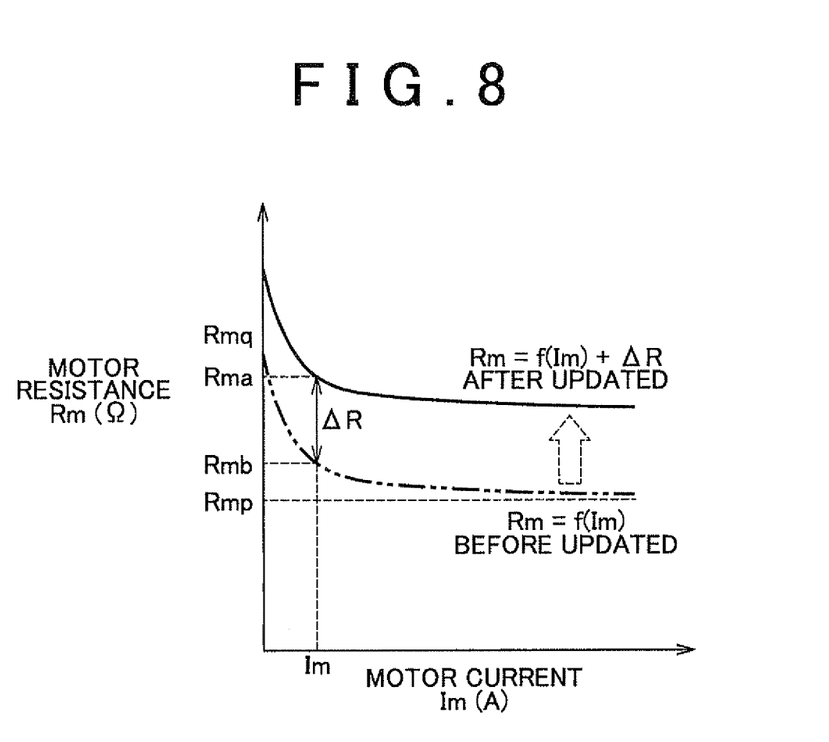
FIG. 8 is a resistance map that defines the relation between the motor current and the motor resistance, which is used by the electronic control unit in the first example embodiment.

The resistance map defines the relation between the motor current IM and the motor resistance Rm. Because the motor resistance Rm changes depending upon the motor current Im, the motor resistance Rm is determined using the resistance map. The resistance map is prepared in advance by specifying, through measurements, the relation between the motor current IM and the motor resistance Rm, and is stored in the storage portion of the electronic control unit 30.

The resistance map is updated periodically. The resistance map is updated for the following reasons. The resistance map is prepared by specifying, through measurements, the relation between the motor current of a sample motor having typical characteristics and the motor resistance of the sample motor. However, the characteristics vary among motors that may be used as the motor 21. Thus, the actual relation between the motor current and motor resistance of a specific motor used as the motor 21 does not coincide with that defined by the resistance map stored in the storage portion of the electronic control unit 30. If the difference between the resistance value determined using the resistance map stored in the storage portion of the electronic control unit 30 and the actual resistance value of the motor 21 is large, the motor resistance Rm calculated using the resistance map is significantly different from the actual resistance value of the motor 21. The motor resistance changes due to repeated use over the years and depending upon the ambient temperature, etc. For this reason, even if the actual characteristics of the motor 21 are originally identical to those of the sample motor, it is often the case that the actual motor resistance of the motor 21 becomes different, due to repeated use over the years, from the motor resistance Rm calculated using the resistance map. In order to ensure that a value close to the actual motor resistance is calculated as the motor resistance Rm using the resistance map, preferably, the resistance map is updated to minimize the difference described above.

The resistance map is updated when there is a large difference between the motor resistance calculated using the resistance map in a state where the motor 21 is in a resistance value calculation allowable state (will hereinafter be referred to as "estimated motor resistance Rma") and the motor resistance Rm determined using the resistance map. It is to be noted that the resistance value calculation allowable state represents a state of the motor 21 where the resistance of the motor 21 is able to be calculated based on the current and voltage. More specifically, when the induced voltage of the motor 21 is close to zero, that is, when the rotation speed of the motor 21 is close to zero and thus the rotation speed does not largely change, the resistance of the motor 21 is calculated using the following Equation 2.

$$Rx = Vm/Im \qquad \text{Equation 2}$$

Therefore, the resistance value calculation allowable state is the state where the induced voltage at the motor 21 is close to zero, that is, the state where the speed of the motor 21 is close to zero and thus the rotation speed does not largely change.

The actual motor resistance is calculated by applying, to Equation 2 shown above, the motor voltage Vm and the motor current Im obtained when the motor 21 is in the resistance value calculation allowable state. It is to be noted that the actual motor resistance calculated using Equation 2 will hereinafter be referred to as "actual motor resistance Rx". Equation 2 is obtained by substituting 0 for $\bar{\omega}$ in Equation 1. That is, Equation 2 is satisfied when the rotation speed of the motor 21 is close to zero, that is, when the motor rotational angular velocity $\bar{\omega}m$ of the motor 21 is regarded as zero.

Meanwhile, whether the motor 21 is presently in the resistance value calculation allowable state is determined based on the induced voltage calculated using a disturbance observer (will hereinafter be referred to as "estimated induced voltage Exa"). More specifically, the motor 21 is determined as being in the resistance value calculation allowable state when the absolute value of the estimated induced voltage EXa is equal to or smaller than a determination value VTA and the absolute value of a differential value ΔEX of the estimated induced voltage EXa is equal to or smaller than a voltage reference value VTB. This determination criterion is based on the fact that when the motor rotational angular velocity $\bar{\omega}m$ is substantially zero, an induced voltage EX is substantially zero and therefore the differential value ΔEX of the estimated induced voltage EXa is substantially zero.

The determination value VTA is set to the upper limit of the absolute value range of the estimated induced voltage EXa in which the motor 21 may be determined as being in the resistance value calculation allowable state. The voltage reference value VTB is set to the upper limit of the absolute value range of the differential value ΔEX of the estimated induced voltage EXa in which the motor 21 may be determined as being in the resistance value calculation allowable state.

The induced voltage EX is the back electromotive force voltage that occurs against the inter-terminal voltage of the motor 21, and therefore it is impossible to detect the induced voltage EX independently. For this reason, the induced voltage EX is treated as a disturbance to the control of the motor 21, and the induced voltage EX is calculated using the disturbance observer.

The following Equations 3 and 4 represent the continuous-time minimum order observer for calculating the induced voltage EX.

$$d\xi/dt = (Gob/L) \cdot \{Vm + (Gob - Rm) \cdot Im - \xi\} \qquad \text{Equation 3}$$

$$EXa = \xi - Gob \cdot Im \qquad \text{Equation 4}$$

In Equations 3 and 4, ξ is an intermediate variable, Gob is an observer gain (fixed value), EXa represents the estimated induced voltage, and L represents the inductance.

The following Equation 5 is obtained from Equations 3 and 4 shown above.

$$dEXa/dt = (Gob/L)\{Vm - (Rm + L \cdot d/dt)Im - EXa\} \qquad \text{Equation 5}$$

Then, the following Equation 6 is obtained by solving Equation 5 with "Vm−(Rm+L·d/dt)·Im" represented as ϵ.

$$EXa = \{a/((dt) + a)\} \cdot \epsilon \qquad \text{Equation 6}$$

In Equation 6 above, a represents Gob/L, and (dt) is a differential operator (d/dt).

Using the above equations, the induced voltage EX is calculated based on the motor voltage Vm, the motor current Im, and the motor resistance Rm. However, the above equations provide a continuous-time model, and therefore this model cannot be used by the electronic control unit 30 that executes calculation processes periodically. Therefore, the continuous-time model is converted into a discrete-time system corresponding to the actual model.

In the discrete-time system, the intermediate variable is obtained as expressed by Equation 7 shown below.

$$d\xi/dt = \{\xi(n) - \xi(n-1)\}/Ts \qquad \text{Equation 7}$$

In Equation 7 above, Ts represents the calculation cycle of the estimated induced voltage EXa, ξ(n) represents the value of the intermediate variable in the nth calculation cycle, and ξ(n−1) represents the value of the intermediate variable in the n−1th calculation cycle. Then, the following Equations 8 and 9 are obtained by substituting Equation 7 into Equations 3 and 4, respectively.

$$\xi(n) = (1 - Gob \cdot Ts/L) \cdot \xi(n-1) + (Gob \cdot Ts/L) \cdot \{Vm(n) + (Gob - Rm) \cdot Im(n)\} \qquad \text{Equation 8}$$

$$Exa(n) = \xi(n-1) - Gob \cdot Im(n) \qquad \text{Equation 9}$$

In Equations 8 and 9 above, Vm(n) represents the value of the motor voltage Vm in the nth calculation cycle, and Im(n) represents the value of the motor current Im in the nth calculation cycle. This is how the estimated induced voltage EXa is calculated using the disturbance observer. Then, whether the motor 21 is presently in the resistance value calculation allowable state is determined based on the estimated induced voltage EXa. If the motor 21 is presently in the resistance value calculation allowable state, the resistance map is updated.

In the following, the procedure of "resistance map updating routine", which is the process for updating the resistance map, will be described with reference to FIG. 2. It is to be noted that the resistance map updating routine is repeatedly executed by the electronic control unit 30 at given calculation cycles.

Figure 2:
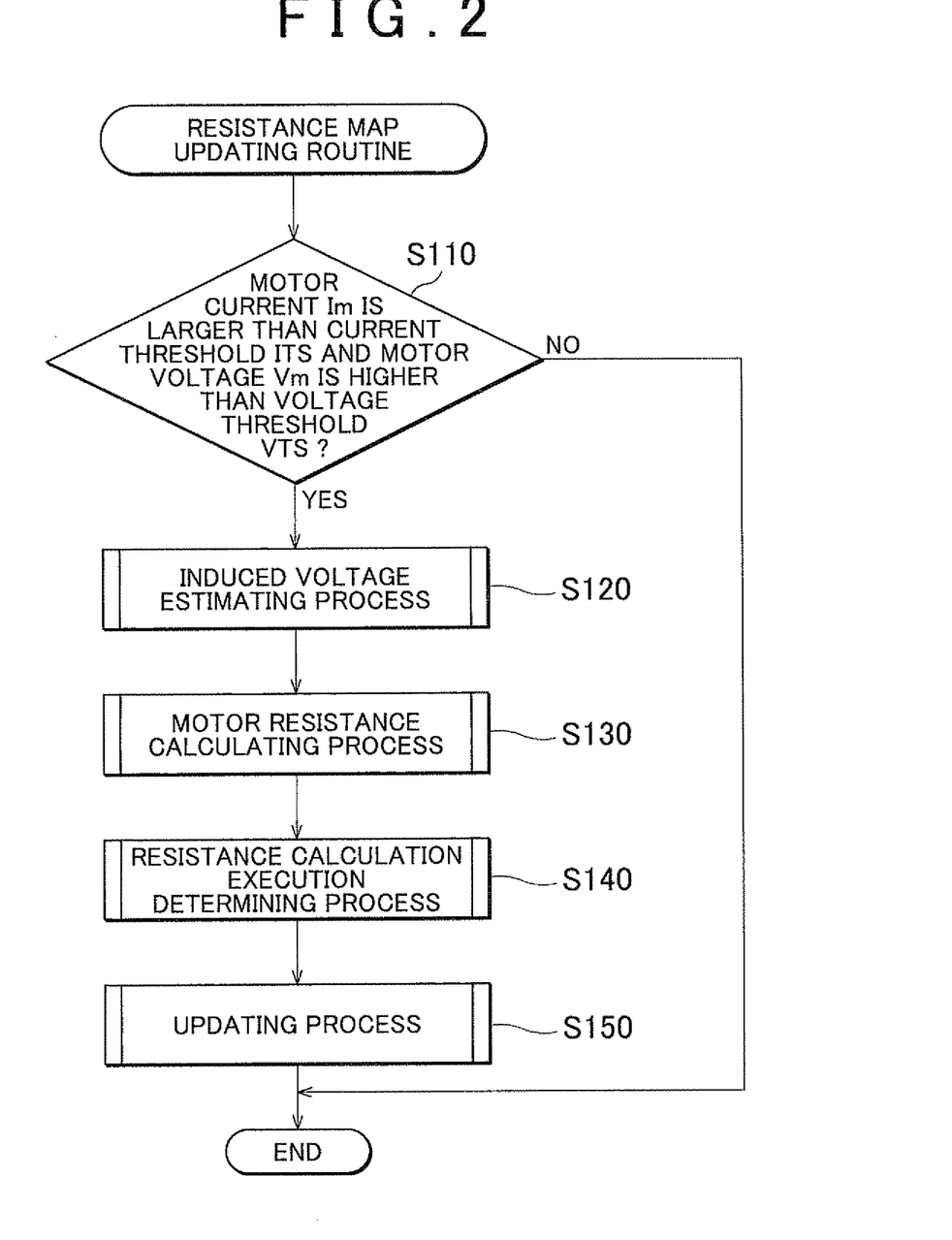
FIG. 2 is a flowchart illustrating the procedure of "resistance map updating routine" that is executed by an electronic control unit of the electric power steering system according to the first example embodiment.

Referring to the flowchart of FIG. 2, the electronic control unit 30 first determines, in step S110, whether the motor current Im and the motor voltage Vm are both larger than zero. More specifically, at this time, if the motor current Im is larger than a current threshold ITS and the motor voltage Vm is higher than a voltage threshold VTS, the electronic control unit 30 proceeds to the next step. In contrast, in other cases, that is, if the motor current Im is equal to or smaller than the current threshold ITS and/or the motor voltage Vm is equal to or lower than the voltage threshold VTS, the electronic control unit 30 finishes the present cycle of the resistance map updating routine.

Meanwhile, the current threshold ITS is set to the upper limit of the current range in which the current supplied to the motor 21 is regarded as zero, and the voltage threshold VTS is set to the upper limit of the voltage range in which the motor voltage Vm is regarded as zero. This process prevents the calculated value of the estimated induced voltage EXa and the calculated value of the actual motor resistance Rx from becoming zero or prevents divergence of the calculated values.

Subsequently, the electronic control unit 30 executes "induced voltage estimating process" in step S120, executes "motor resistance calculating process" in step S130, executes "resistance calculation execution determining process" in step S140, and executes "updating process" in step S150, as will be described in detail below.

Figure 3:
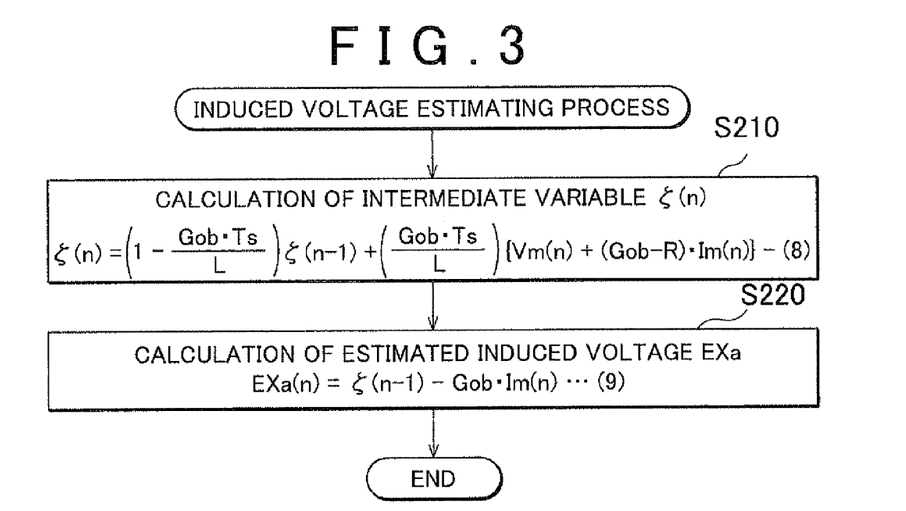
FIG. 3 is a flowchart illustrating the procedure of "induced voltage estimating process" that is executed by the electronic control unit in the first example embodiment.

First, the procedure of the induced voltage estimating process will be described with reference to FIG. 3. As shown in the flowchart of FIG. 3, the electronic control unit 30 calculates the intermediate variable ξ(n) using Equation 8 in step S210, and then calculates the estimated induced voltage EXa using Equation 9 in step S220.

Figure 4:
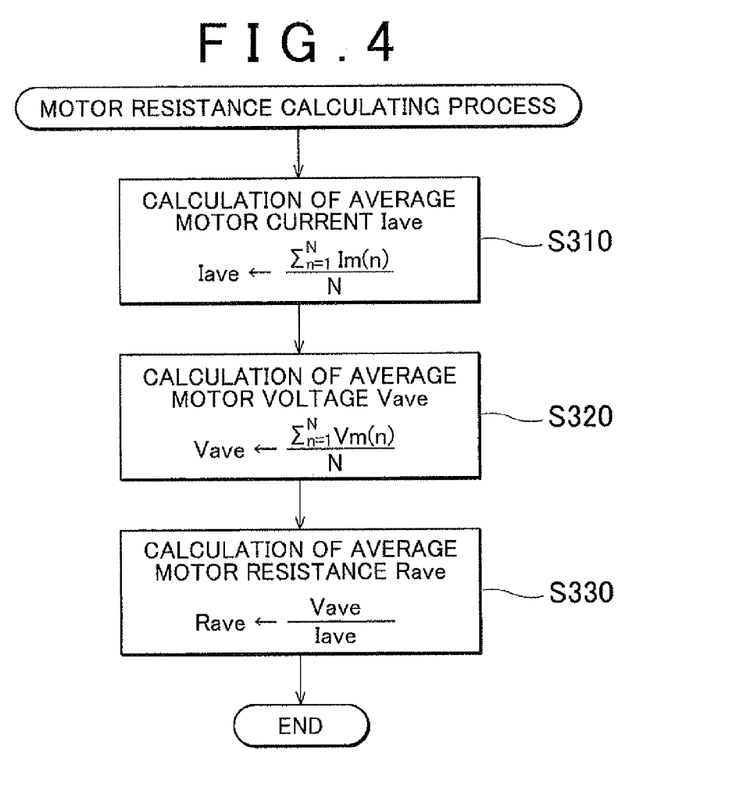
FIG. 4 is a flowchart illustrating the procedure of "motor resistance calculating process" that is executed by the electronic control unit in the first example embodiment.

Next, the procedure of the motor resistance calculating process will be described with reference to FIG. 4. As shown in the flowchart of FIG. 4, the electronic control unit 30 calculates, in step S310, an average motor current Iave representing the average of the value of the motor current Im in the present calculation cycle and those in the last several calculation cycles, which are stored in the storage portion of the electronic control unit 30.

Subsequently, in step S320, the electronic control unit 30 calculates an average motor voltage Vave representing the average of the value of the motor voltage Vm in the present calculation cycle and those in the last several calculation cycles, which are stored in the storage portion of the electronic control unit 30.

Next, in step S330, the electronic control unit 30 calculates an average motor resistance Rave in the present calculation cycle from the average motor current Iave and the average motor voltage Vave, which have been calculated in the calculation processes described above, and then stores the calculated average motor resistance Rave into the storage portion of the electronic control unit 30.

This is how the averages of the motor current Im, motor voltage Vm, and actual motor resistance Rx are calculated. Calculating the averages of the motor current Im, motor voltage Vm, and actual motor resistance Rx in the manners described above reduces the noise components included in the respective values and thus enables obtaining more stable results.

Figure 5:
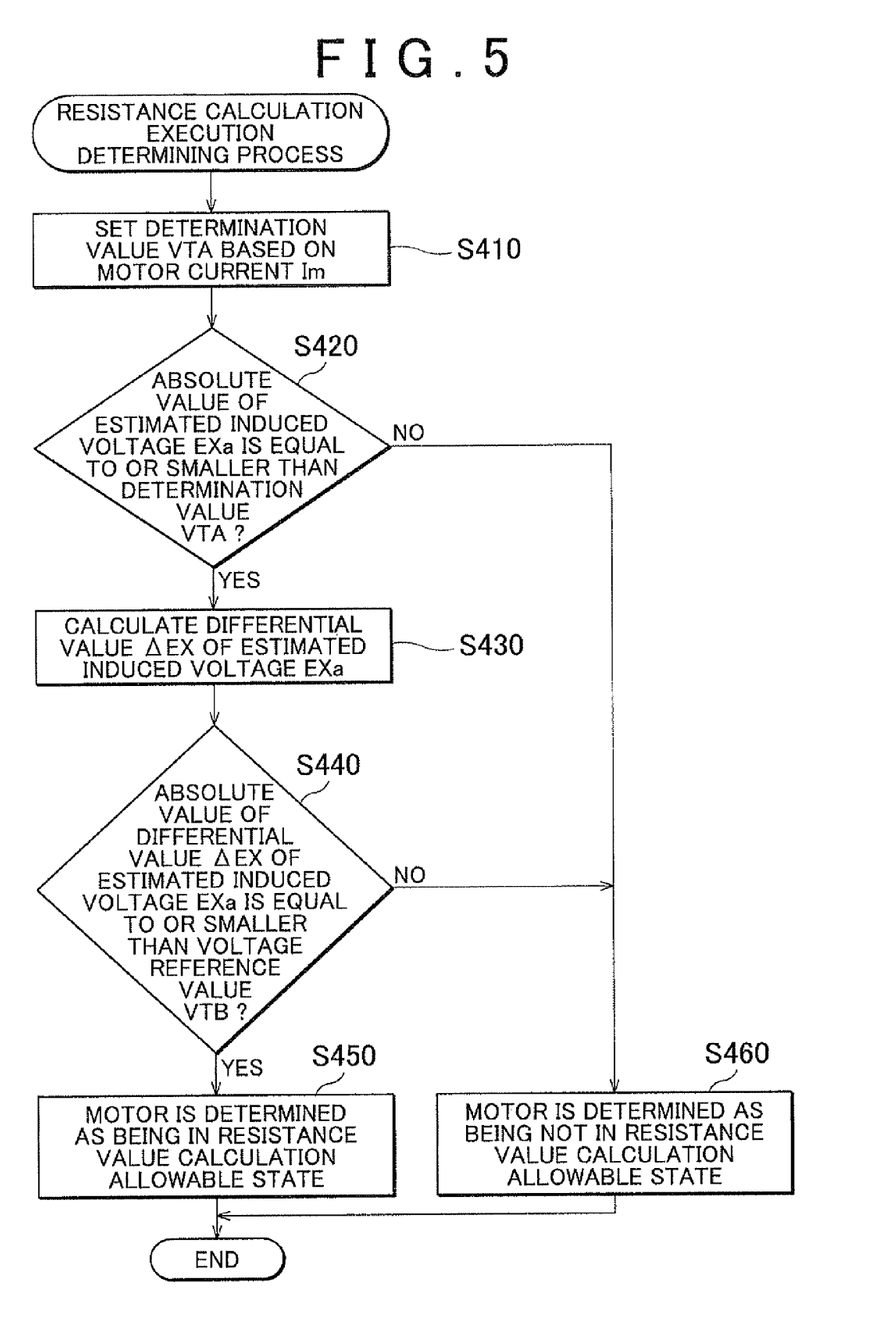
FIG. 5 is a flowchart illustrating the procedure of "resistance calculation execution determining process" that is executed by the electronic control unit in the first example embodiment.

Next, the procedure of the resistance calculation execution determining process will be described with reference to FIG. 5. As shown in the flowchart of FIG. 5, in step S410, the electronic control unit 30 first sets the level of the determination value VTA in step S410. This setting is performed for the following reason. The induced voltage EX depends on the level of the motor current Im. Therefore, if the determination value VTA is a constant, whether the motor 21 is presently in the resistance value calculation allowable state is not determined accurately. Thus, the determination value VTA is set to a value corresponding to the level of the motor current Im at the time of executing this determining process. The relation between the motor current Im and the determination value VTA is set in advance in the form of a determination map, and the determination map is stored in the storage portion of the electronic control unit 30.

In step S420, the electronic control unit 30 determines whether the absolute value of the estimated induced voltage EXa is equal to or smaller than the determination value VTA set as described above. If the result of the determination is positive, the electronic control unit 30 proceeds to the next step. On the other hand, if the absolute value of the estimated induced voltage EXa is larger than the determination value VTA, the electronic control unit 30 proceeds to step S460 to determine that the motor 21 is not presently in the resistance value calculation allowable state.

Meanwhile, in step S430, the electronic control unit 30 differentiates the estimated induced voltage EXa in the present calculation cycle to calculate the amount of change per unit time, that is, the differential value ΔEX. For example, in this step, the electronic control unit 30 obtains the differential value ΔEX by dividing the difference between the value of the estimated induced voltage EXa in the present calculation cycle and the value of the estimated induced voltage EXa in the last calculation cycle by the calculation cycle.

Next, in step S440, the electronic control unit 30 determines whether the absolute value of the differential value ΔEX of the estimated induced voltage EXa is equal to or smaller than the voltage reference value VTB. If the result of the determination is positive, the electronic control unit 30 proceeds to step S450 to determine that the motor 21 is presently in the resistance value calculation allowable state. On the other hand, if the absolute value of the differential value ΔEX of the estimated induced voltage EXa is larger than the voltage reference value VTB, the motor 21 proceeds to step S460 to determine that the motor 21 is not presently in the resistance value calculation allowable state.

Figure 6:
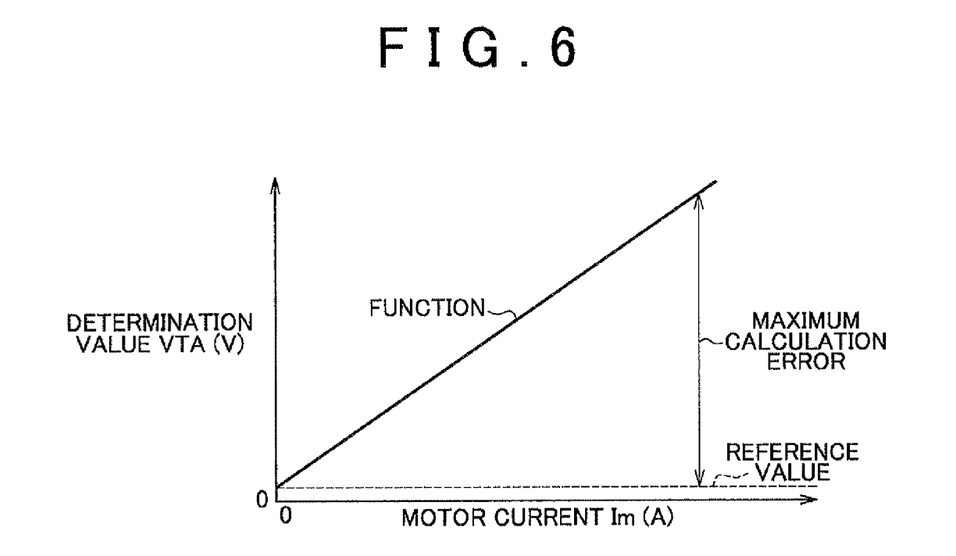
FIG. 6 is a determination map that defines the relation between a determination value and the motor current, which is used in the resistance calculation execution determining process executed by the electronic control unit in the first example embodiment.

In the following, the particulars of the determination map will be described with reference to FIG. 6. FIG. 6 illustrates the determination map, by way of example. The determination value VTA is set by taking into account the level of the motor current Im and the maximum calculation error in the estimated induced voltage EXa, which may be caused by the disturbance observer. More specifically, the determination map is defined as a function that provides a larger value as the motor current Im increases.

The following explains why the maximum calculation error in the estimated induced voltage EXa is taken into account when setting the determination value VTA. Preferably, the accuracy in determining whether the motor 21 is in the resistance value calculation allowable state is high enough to ensure that the motor rotational angular velocity $\overline{\omega}m$ is equal to or lower than a predetermined value. When the motor rotational angular velocity $\overline{\omega}m$ is zero, the induced voltage EX is zero. Therefore, if the absolute value of the estimated induced voltage EXa is close to zero and is equal to or smaller than a reference value that is larger than zero (refer to the broken line in FIG. 6), the motor rotational angular velocity $\overline{\omega}m$ is deemed as being equal to or lower than the predetermined value. However, if the estimated induced voltage EXa is calculated using the disturbance observer, calculation errors occur in the estimated induced voltage EXa. The calculation errors occur due to a change in the inductance L and a change in the actual motor resistance Rx. Therefore, even in a case where the actual induced voltage EX remains unchanged, if the estimated induced voltage EXa is calculated using the disturbance observer, the value of the estimated induced voltage EXa changes each time it is calculated. Therefore, calculation errors occur in the estimated induced voltage EXa. Therefore, even in a case where the actual induced voltage EX remains unchanged, the value of the estimated induced voltage EXa changes each time it is calculated, and thus the determination result may vary each time the estimated induced voltage EXa is calculated.

In view of the above, for the purpose of minimizing such a variation of the determination result caused by calculation errors, the maximum calculation error corresponding to the motor current Im is added to the reference value. It is to be noted that the maximum calculation error is set to the difference between the smallest value and the largest value among the values of the estimated induced voltage EXa that are calculated through the induced voltage estimating process in a situation where the motor 21 is controlled such that the actual induced voltage EX remains constant.

The maximum calculation error in the estimated induced voltage EXa depends on the motor current Im. That is, even in a case where the motor rotational angular velocity $\bar{\omega}$m remains unchanged, if the level of the motor current Im changes, the value of the maximum calculation error in the estimated induced voltage EXa changes. More specifically, the larger the motor current Im is, the larger the value of the maximum calculation error in the estimated induced voltage EXa is. Therefore, the larger the motor current Im is, the larger the determination value VTA is. It is to be noted that the maximum calculation error is set to zero when the motor current Im is zero.

Figure 7:
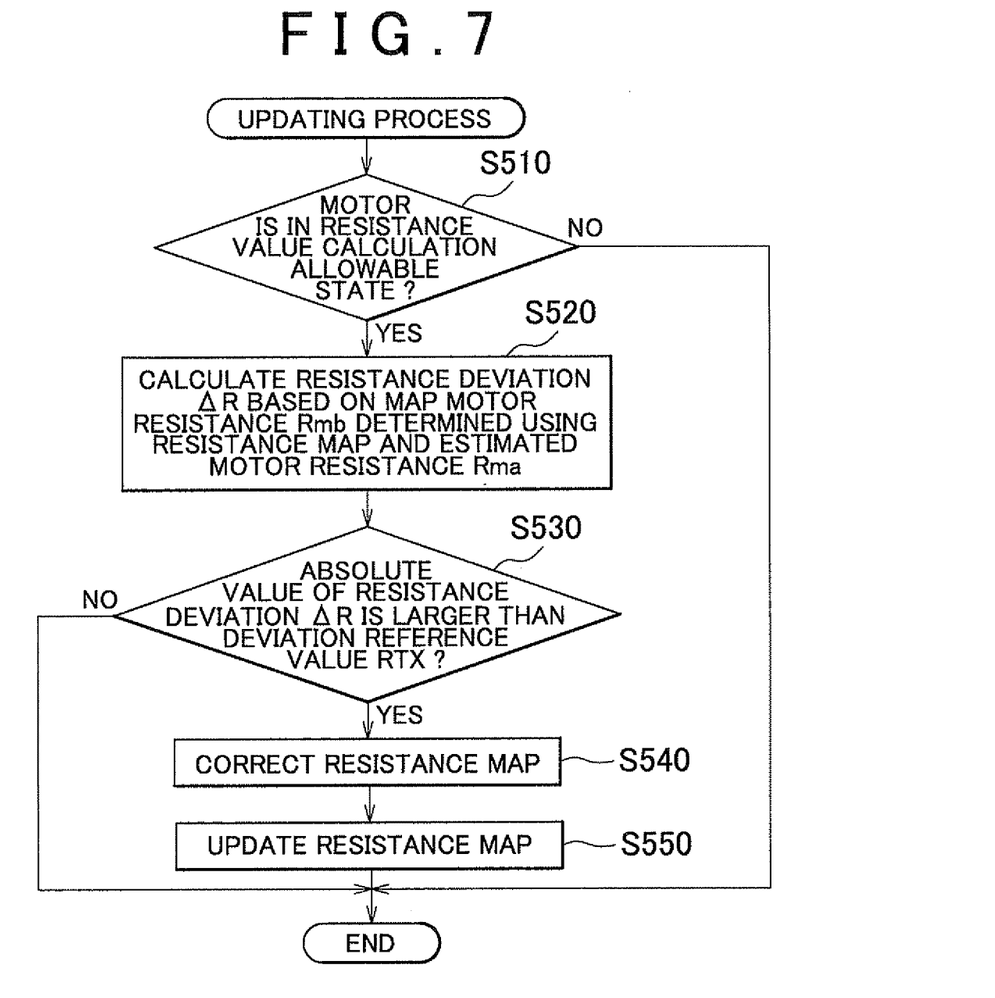
FIG. 7 is a flowchart illustrating the procedure of "updating process" that is executed by the electronic control unit in the first example embodiment.

In the following, the procedure of the updating process will be described with reference to FIG. 7. In the updating process, the electronic control unit 30 updates the resistance map when the motor 21 is presently in the resistance value calculation allowable state. Referring to the flowchart of FIG. 7, the electronic control unit 30 determines whether the motor 21 is presently in the resistance value calculation allowable state in step S510. If it has been determined in the resistance calculation execution determining process that the motor 21 is presently in the resistance value calculation allowable state, the electronic control unit 30 proceeds to the next step. On the other hand, if it is determined in the resistance calculation execution determining process that the motor 21 is not presently in the resistance value calculation allowable state, the electronic control unit 30 finishes the present cycle of the updating process.

In step S520, the electronic control unit 30 determines the motor resistance Rm by applying the motor current Im in the present calculation cycle to the resistance map (will hereinafter be referred to as "the map motor resistance Rmb"), and reads the average motor resistance Rave stored in the storage portion of the electronic control unit 30. Note that the average motor resistance Rave read at this time is regarded as the motor resistance Rm obtained when the motor 21 is in the resistance value calculation allowable state (will hereinafter be referred to as "the estimated motor resistance Rma"). The electronic control unit 30 calculates a resistance deviation ΔR representing the difference between the map motor resistance Rmb and the estimated motor resistance Rma, and stores the calculated resistance deviation ΔR into the storage portion of the electronic control unit 30.

Subsequently, in step S530, the electronic control unit 30 determines whether the absolute value of the resistance deviation ΔR is larger than a deviation reference value RTX. If the result of the determination is positive, the electronic control unit 30 proceeds to the next step. On the other hand, if the absolute value of the resistance deviation ΔR is equal to or smaller than the deviation reference value RTX, the electronic control unit 30 finishes the present cycle of the updating process. That is, the present resistance map is maintained. It is to be noted that the deviation reference value RTX is the maximum permissible difference between the map motor resistance Rmb and the estimated motor resistance Rma.

Meanwhile, in step S540 that is executed when a positive result has been obtained in step S530, the electronic control unit 30 corrects the resistance map. More specifically, at this time, the electronic control unit 30 updates the resistance map that is defined, by way of example, as "Rm=f(Im)", which is the function representing the motor resistance Rm corresponding to the motor current Im, by adding the resistance deviation ΔR to the function "Rm=f(Im)". As a result, a new function "Rm=f(Im)+ΔR" is obtained.

Then, in step S550, the electronic control unit 30 stores the newly obtained function "Rm=f(Im)+ΔR" into the storage portion of the electronic control unit 30, as the resistance map to be used from the next calculation cycle. In this way, the resistance map stored in the storage portion of the electronic control unit 30 is updated to the newly calculated resistance map.

In the following, an example of the resistance map will be described with reference to FIG. 8. Referring to FIG. 8, the resistance map is defined as the function "Rm=f(Im)". This function "Rm=f(Im)" is set as follows. When the motor current Im is zero, the motor resistance Rm is a maximum value Rmq. As the motor current Im increases up to a predetermined value from zero, the motor resistance Rm decreases at a given rate. However, as the motor current Im further increases from the predetermined value, the rate of decrease in the motor resistance Rm becomes lower, so that the motor resistance Rm becomes closer to a predetermined value Rmp.

The electric power steering system 1 according to the first example embodiment provides the following effects.

1) In the first example embodiment, when the absolute value of the estimated induced voltage EXa is equal to or smaller than the determination value VTA that is set in accordance with the level of the current, the estimated motor resistance Rma is calculated based on the motor current Im and the motor voltage Vm, and the resistance map is updated based on the estimated motor resistance Rma.

With this structure, whether the motor 21 is presently in the resistance value calculation allowable state is determined accurately, and therefore it is possible to prevent a large difference between the motor resistance Rm determined using the resistance map and the actual motor resistance.

2) In the first example embodiment, the differential value ΔEX (induced voltage variation) that is the amount by which the estimated induced voltage EXa changes with time is calculated. When the absolute value of the estimated induced voltage EXa is equal to or smaller than the determination value VTA and the absolute value of the differential value ΔEX is equal to or smaller than the voltage reference value VTB, the motor 21 is determined as being in the resistance value calculation allowable state.

It is often the case that the motor 21 is not in the resistance value calculation allowable state even though the absolute value of the estimated induced voltage EXa is equal to or smaller than the determination value VTA. With the structure described above, because the motor 21 is determined as being in the resistance value calculation allowable state on the condition that the absolute value of the differential value ΔEX of the estimated induced voltage EXa is equal to or smaller than the voltage reference value VTB, in addition to the condition that the absolute value of the estimated induced voltage EXa is small, whether the motor 21 is presently in the resistance value calculation allowable state is determined more accurately.

3) In the first example embodiment, the estimated induced voltage EXa is calculated using the disturbance observer that treats the estimated induced voltage EXa as a disturbing factor. Thus, it is possible to calculate the induced voltage EX that is difficult to directly detect as a physical quantity.

4) In the first example embodiment, the determination value VTA is set by adding the maximum calculation error that may be caused by the disturbance observer. With this structure, the possibility that the motor 21 will be determined as being the resistance value calculation allowable state when the motor 21 is not actually in the resistance value calculation allowable state is lower than cases where the determination value VTA is set by adding a value larger than the maximum calculation error.

Figure 9:
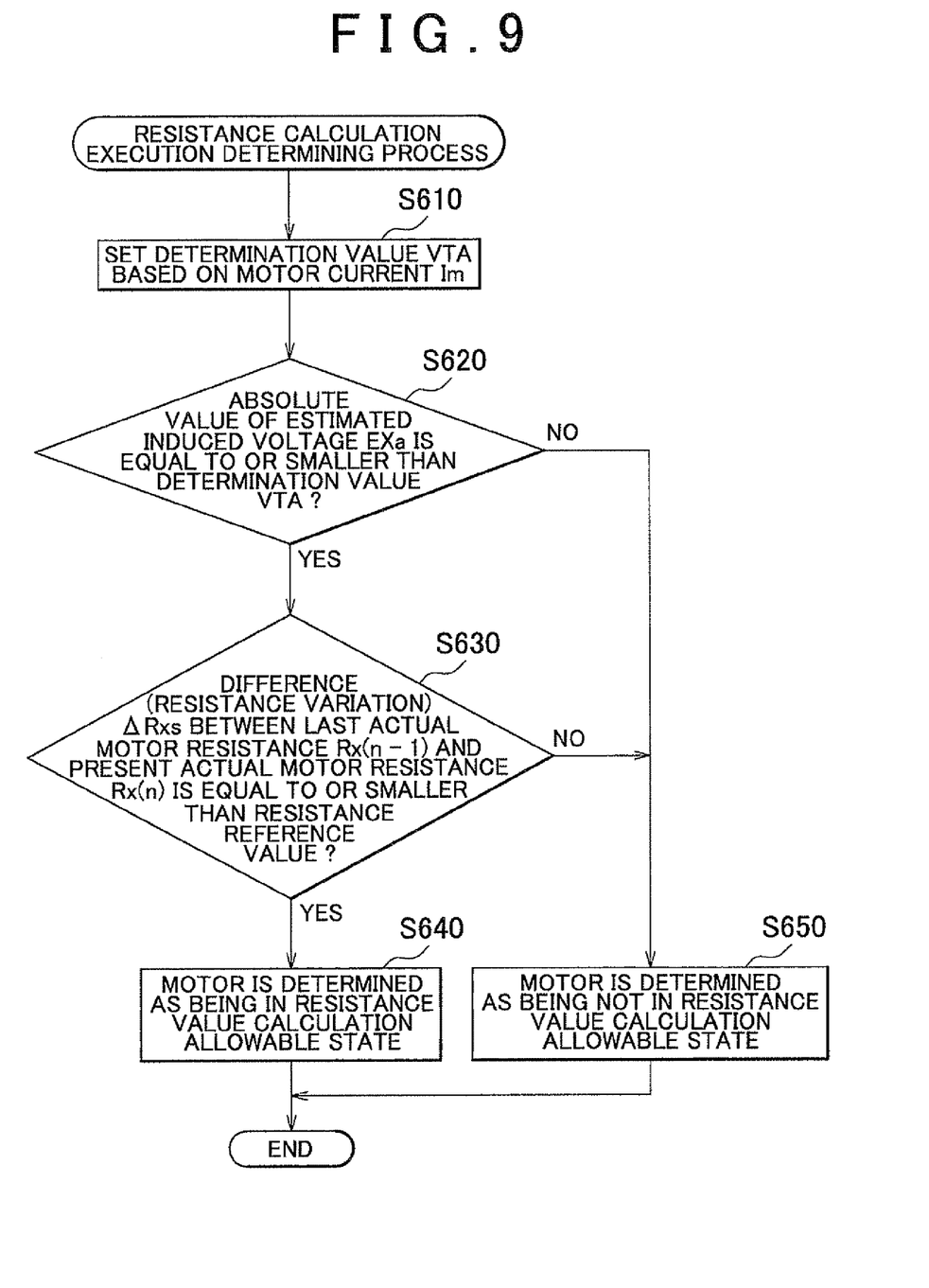
FIG. 9 is a flowchart illustrating the procedure of "resistance calculation execution determining process" that is executed by an electronic control unit of an electric power steering system according to a second example embodiment of the invention.

In the following, the electric power steering system 1 according to a second example embodiment of the invention will be described with reference to FIG. 9. The resistance calculation execution determining process in the second example embodiment is different from that in the first example embodiment as follows. Whether the absolute value of the differential value ΔEX of the estimated induced voltage EXa is equal to or smaller than the voltage reference value VTB is determined in step S440 as the second condition for determining whether the motor 21 is presently in the resistance value calculation allowable state in the first example embodiment. In contrast to this, whether a resistance variation Rms representing a change in the estimated motor resistance Rma is equal to or smaller than a resistance reference value RTA is determined as the second condition in the second example embodiment.

Hereinafter, the structural differences of the electric power steering system 1 according to the second example embodiment from the electric power steering system 1 according to the first example embodiment, which are associated with the difference described above, will be described. It is to be noted that the same components as those in the first example embodiment will be denoted using the same reference numerals, and their descriptions will be entirely, or partially, omitted.

The processes executed in steps S610 and S620 of the resistance calculation execution determining process in the second example embodiment are identical to those executed in steps S410 and S420 of the resistance calculation execution determining process in the first example embodiment. That is, through steps S610 and S620, the electronic control unit 30 determines whether the absolute value of the estimated induced voltage EXa is equal to or smaller than the determination value VTA.

Then, in step S630, the electronic control unit 30 calculates a resistance variation ΔRxs representing the difference between the value of the actual motor resistance Rx(n−1) in the last calculation cycle, which is stored in the storage portion of the electronic control unit 30, and the value of the actual motor resistance Rx(n) in the present calculation cycle. It is to be noted that the actual motor resistance Rx(n−1) corresponds to the average motor resistance Rave in the n−1th calculation cycle and the actual motor resistance Rx(n) corresponds to the average motor resistance Rave in the nth calculation cycle.

The electronic control unit 30 determines whether the absolute value of the resistance variation ΔRxs is equal to or smaller than the resistance reference value RTA. If the result of the determination is positive, the electronic control unit 30 proceeds to step S640 to determine that the motor 21 is presently in the resistance value calculation allowable state. On the other hand, if the absolute value of the resistance variation ΔRxs is larger than the resistance reference value RTA, the electronic control unit 30 proceeds to step S650 to determine that the motor 21 is not presently in the resistance value calculation allowable state.

Meanwhile, the resistance variation ΔRxs of the actual motor resistance Rx is small when the motor 21 is in the resistance value calculation allowable state. For this reason, the condition described above may be used in place of the second condition used in the determination as to whether the motor 21 is in the resistance value calculation allowable state in the first example embodiment, that is, the condition used in step S440.

The electric power steering system 1 according to the second example embodiment provides the following effects, in addition to the effects 1), 3), and 4) of the electric power steering system 1 of the first example embodiment.

5) In the second example embodiment, the resistance variation ΔRxs representing the difference between the value of the actual motor resistance Rx at the time of calculating the estimated induced voltage EXa and the value of the actual motor resistance Rx calculated previously is calculated. If the absolute value of the estimated induced voltage EXa is equal to or smaller than the determination value VTA and the absolute value of the resistance variation ΔRxs is equal to or smaller than the resistance reference value RTA, the motor 21 is determined as being in the resistance value calculation allowable state.

With the structure described above, because the motor 21 is determined as being in the resistance value calculation allowable state on the condition that the absolute value of the resistance variation ΔRxs is equal to or smaller than the resistance reference value RTA, in addition to the condition that the absolute value of the estimated induced voltage EXa is small, whether the motor 21 is presently in the resistance value calculation allowable state is determined more accurately. As a result, it is possible to reduce the possibility that the resistance map will be updated when the motor 21 is not in the resistance value calculation allowable state.

Figure 10:
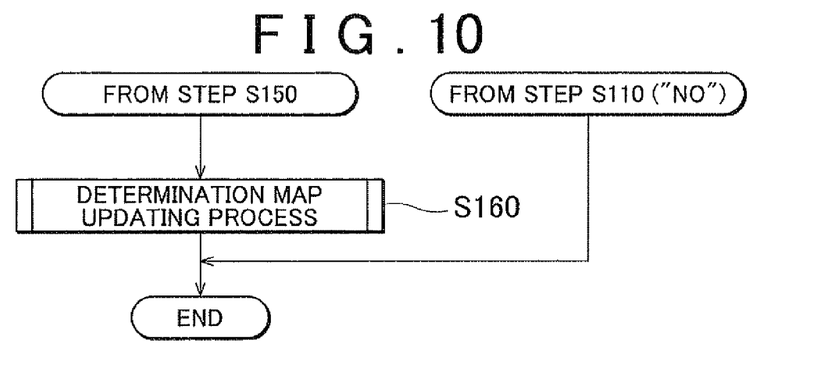
FIG. 10 is a flowchart illustrating a part of the procedure of "resistance map updating routine" that is executed by an electronic control unit of an electric power steering system according to a third example embodiment of the invention.
Figure 11:
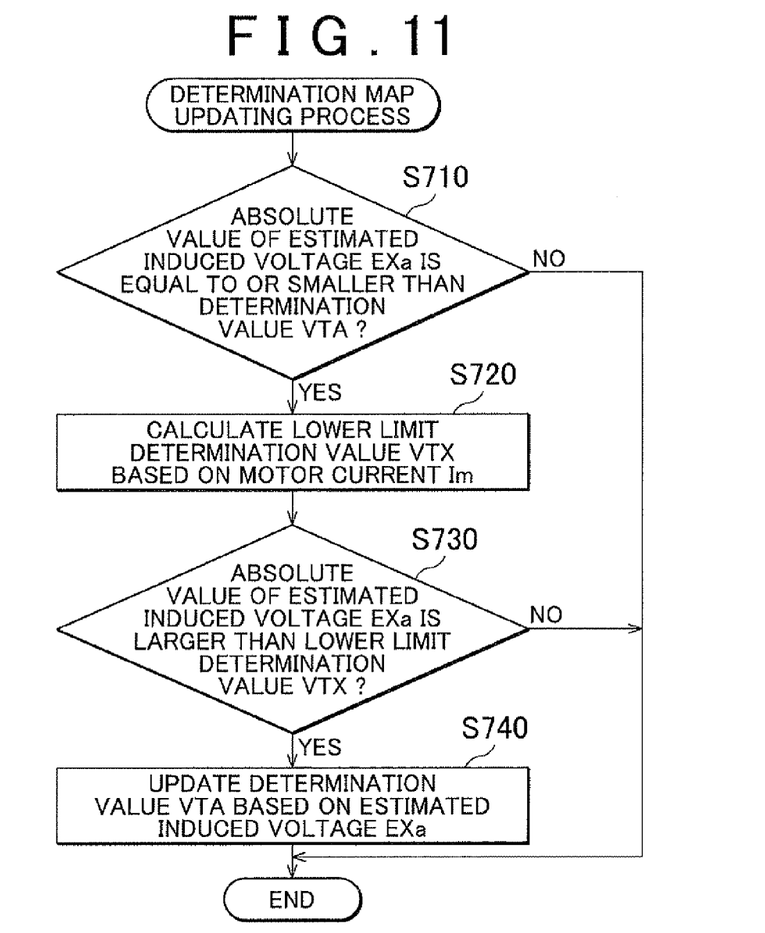
FIG. 11 is a flowchart illustrating the procedure of "determination map updating process" that is executed by the electronic control unit of the electric power steering system according to the third example embodiment.
Figure 12:
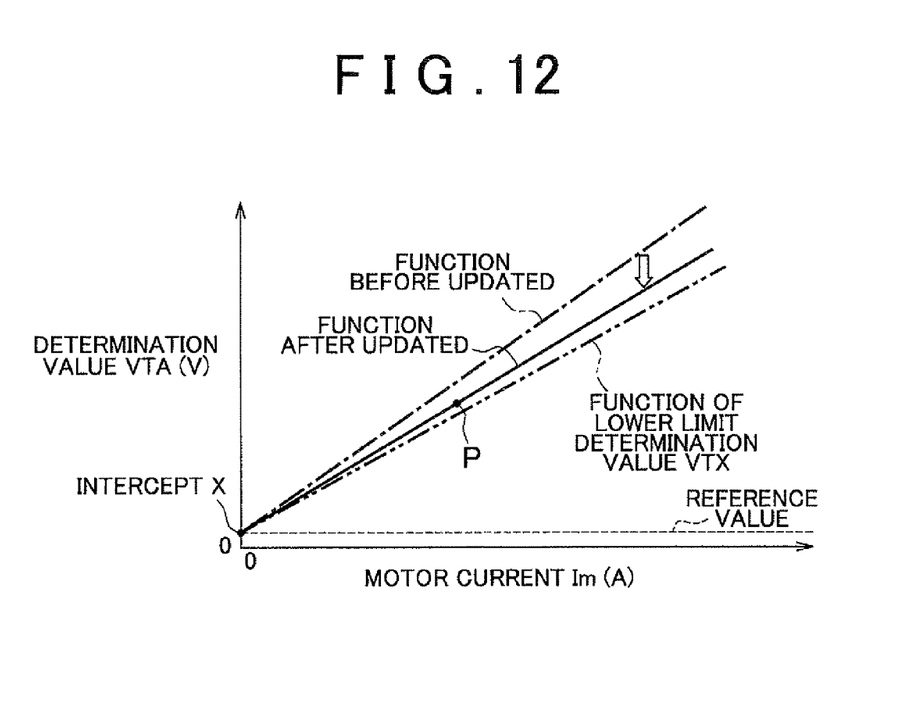
FIG. 12 is a determination map that defines the relation between the motor current and the determination value, which is used in the resistance calculation execution determining process executed by the electronic control unit in the third example embodiment.

In the following, the electric power steering system 1 according to a third example embodiment of the invention will be described with reference to FIGS. 10 to 12. The electric power steering system 1 according to the third example embodiment is structurally different from the electric power steering system 1 of the first example embodiment in that a determination map updating process for updating the determination value VTA based on the estimated induced voltage EXa is additionally incorporated into the resistance map updating routine illustrated in FIG. 2, which is executed in the first example embodiment.

Hereinafter, the structural differences of the electric power steering system 1 according to the third example embodiment from the electric power steering system 1 according to the first example embodiment, which are associated with the difference described above, will be described. It is to be noted that the same components as those in the first example embodiment will be denoted using the same reference numerals, and their descriptions will be entirely, or partially, omitted.

The procedure of the resistance map updating routine will be described with reference to FIG. 10. Referring to the flowchart in FIG. 10, after the process in step S150 shown in FIG. 2 is finished, the electronic control unit 30 proceeds to step S160. In step S160, the electronic control unit 30 executes the determination map updating process illustrated in FIG. 11, and then finishes the present cycle of the resistance map updating routine.

In the following, the procedure of the determination map updating process will be described with reference to FIG. 11. In the determination map updating process, the electronic control unit 30 executes the following processes. Referring to the flowchart of FIG. 11, the electronic control unit 30 first determines whether the absolute value of the estimated induced voltage EXa is equal to or smaller than the determination value VTA in step S710. More specifically, at this time, the electronic control unit 30 determines whether the absolute value of the estimated induced voltage EXa calculated in step S220 of the induced voltage estimating process (refer to FIG. 3) is equal to or smaller than the determination value VTA set in step S410 in the resistance calculation execution determining process (refer to FIG. 5). If the absolute value of the estimated induced voltage EXa is equal to or smaller than the determination value VTA, the electronic control unit 30 proceeds to step S720. On the other hand, if the absolute value of the estimated induced voltage EXa is larger than the determination value VTA, the electronic control unit 30 finishes the present cycle of the determination map updating process without updating the determination value VTA.

In step S720, the electronic control unit 30 calculates a lower limit determination value VTX based on the value of the motor current Im at the time the estimated induced voltage EXa is calculated. A determination map defining the relation between the motor current Im and the lower limit determination value VTX (see the two-dot chain line in FIG. 12) is stored in the storage portion of the electronic control unit 30.

Subsequently, in step S730, the electronic control unit 30 determines whether the absolute value of the estimated induced voltage EXa is larger than the lower limit determination value VTX. If the absolute value of the estimated induced voltage EXa is larger than the lower limit determination value VTX, the electronic control unit 30 proceeds to step S740 to update the determination value VTA based on the absolute value of the estimated induced voltage EXa. More specifically, at this time, the electronic control unit 30 updates the determination map defining the relation between the motor current Im and the determination value VTA, which is stored in the storage portion of the electronic control unit 30. On the other hand, if the absolute value of the estimated induced voltage EXa is equal to or smaller than the lower limit determination value VTX, the electronic control unit 30 finishes the present cycle of the process without updating the determination value VTA.

In the following, how the determination map is updated will be described with reference to FIG. 12. The electronic control unit 30 updates the determination map through the following procedure. A point P is plotted on the determination map based on the absolute value of the estimated induced voltage EXa calculated in the induced voltage estimating process illustrated in FIG. 3 and the value of the motor current Im at the time the estimated induced voltage EXa is calculated. If the value at the point P is equal to or smaller than the determination value VTA but is larger than the lower limit determination value VTX, the function (i.e., the function before updated) (refer to the single-dot chain line in FIG. 12) is updated to the function expressed as the line passing through the point P and an intercept X of the motor current Im axis of the function (refer to the solid line in FIG. 12). As a result, the gradient of the updated function is lower than that of the function before the update.

The electronic control unit 30 stores the updated function into the storage portion of the electronic control unit 30. The updated function stored in the storage portion of the electronic control unit 30 is used in step S410 in the resistance calculation execution determining process (refer to FIG. 5) to set the determination value VTA when the motor 21 starts to operate next time.

The following explains why the function is updated. The initially set function is such that the determination value VTA contains the value corresponding to the maximum calculation error described above, and therefore the possibility that the motor 21 will be determined as being in the resistance calculation allowable state even when it is not actually in the resistance calculation allowable state is relatively high. If such a determination is made, the accuracy of the determination result reflecting the state of the motor 21 is not sufficient. Therefore, in a case where the initially set function is not updated, the accuracy in determining the state of the motor 21 is relatively low. It is to be noted that the value corresponding to the maximum calculation error, which is contained in the determination value VTA, is set by taking into account the dimensional tolerances of the motor 21.

For the reasons set forth above, in order to achieve a higher accuracy in determining the state of the motor 21, the electronic control unit 30 changes the determination value VTA from its initial value to adjust it to a value suitable for the individual motor 21. That is, by updating the function based on the calculated value of the estimated induced voltage EXa, the electronic control unit 30 changes the determination value VTA to a value corresponding to the actual dimensions of the motor 21.

The electric power steering system 1 of the third example embodiment provides the following effects, in addition to the effects 1) to 4) of the electric power steering system 1 of the first example embodiment. 6) In the third example embodiment, the determination value VTA, which is set in accordance with to the motor current Im, is reduced based on the absolute value of the estimated induced voltage EXa when the absolute value of the estimated induced voltage EXa is equal to or smaller than the determination value VTA. Therefore, the determination value VTA is reduced each time the estimated induced voltage EXa of which the absolute value is equal to or smaller than the determination value VTA is calculated. That is, the value corresponding to the maximum calculation error, which is contained in the determination value VTA, is reduced each time the estimated induced voltage EXa of which the absolute value is equal to or smaller than the determination value VTA is calculated. Accordingly, the accuracy in determining whether the motor 21 is presently in the resistance calculation allowable state is relatively high.

7) In the third example embodiment, the determination value VTA is set in step S410 of the resistance calculation execution determining process (refer to FIG. 5), using the updated function stored in the storage portion of the electronic control unit 30, when the motor 21 starts to operate again after stopped. According to this structure, the updated function may be used when the motor 21 starts to operate next time.

8) In the third example embodiment, the function is not updated when the absolute value of the estimated induced voltage EXa is equal to or smaller than the lower limit determination value VTX. With this structure, the possibility that the function will be updated based on the estimated induced voltage EXa that is excessively smaller than the induced voltage EX is relatively low.

The invention is not limited to any of the foregoing example embodiments, but it may be implemented in various other forms and arrangements. For example, the following are example modifications that may be made to the foregoing example embodiments. It is to be understood that the applications of each example modification described below are not limited to those presented below, and the example modifications may be implemented in various combinations.

The function (i.e., the function before updated) is updated to the function expressed as the line passing through the plotted point in the determination map updating process in the third example embodiment. However, the function may be updated to a function expressed as a line that is lower in gradient than the line of the function to be updated but is higher in gradient than the line of the function passing through the plotted point.

The determination value VTA is set using the function that is updated the last time the motor 21 operated, when the motor 21 starts to operate again in the third example embodiment. However, the function may be reset to the initial function each time the motor 21 starts to operate.

The processes in steps S720 and S730 are executed in the determination map updating process in the third example embodiment. However, these processes may be omitted if appropriate.

The function that makes the lower limit determination value VTX larger as the motor current Im becomes larger (see the double-dot chain line in FIG. 12) is used in the third example embodiment. However, the lower limit determination value VTX may be a constant value. In this case, for example, the lower limit determination value VTX may be set to the reference value (see the broken line in FIG. 12).

While the estimated motor resistance Rma is calculated as the average of the motor resistance in the present calculation cycle and those in the last several calculation cycles in the foregoing example embodiments, such an averaging process may be omitted if appropriate.

While the induced voltage EX is calculated using the disturbance observer in the foregoing example embodiments, various other disturbance observers may alternately be used, and equations for calculating the induced voltage EX are not limited to Equations 8 and 9. That is, any disturbance observer may be used as a method for calculating the induced voltage EX as long as it is obtained by modeling a motor equation (s) with the induced voltage EX regarded as a disturbing factor.

While the estimated induced voltage EXa is calculated using the disturbance observer in the foregoing example embodiments, various calculation methods other than disturbance observers may alternatively be used to calculate the estimated induced voltage EXa. For example, Equation 10 that is a voltage equation written for the motor 21 but not including any term related to the inductance L of the motor 21 may be used to calculate the estimated induced voltage EXa.

$$EXa = Vm - Rm \times Im \qquad \text{Equation 10}$$

In the case where the above equation 10 is used, too, because the maximum calculation error in the estimated induced voltage EXa changes depending upon the motor current Im, a determination map corresponding to the relation between the maximum calculation error and the motor current Im is used.

While the determination value VTA is defined as the function in which the maximum calculation error in the estimated induced voltage EXa is added to the reference value (refer to the broken lines in FIGS. 6 and 12) in the foregoing example embodiments, the determination value VTA may alternatively be defined as a function in which a correction value that changes in accordance with the motor current Im is added to the reference value. The correction value may be, for example, a value that changes in accordance with the motor current Im, with a gradient smaller than the maximum calculation error. Further, the correction value may be, for example, a value that changes in accordance with the motor current Im, with a gradient higher than the maximum calculation error.

While the function of the determination value VTA is such that the maximum calculation error becomes larger as the motor current Im becomes larger in the foregoing example embodiments, the function of the determination value VTA may be such that the maximum calculation error increases in steps with an increase in the motor current Im.

While the resistance calculation execution determining process uses the first and second conditions as the conditions for determining that the motor 21 is presently in the resistance calculation allowable state in the foregoing example embodiments, the second condition may be omitted if appropriate. This is because the motor 21 may be determined as being in the resistance calculation allowable state even when only the first condition is satisfied.

While the rotational angular velocity $\bar{\omega}m$ and the estimated induced voltage EXa are calculated using the motor resistance Rm in the foregoing example embodiments, at least one of the rotational angular velocity $\bar{\omega}m$ and the estimated induced voltage EXa may be calculated using the actual motor resistance Rx (example modification XA).

In the example modification XA described above, the actual motor resistance Rx may be stored in the storage portion of the electronic control unit 30 in place of the resistance map. In this case, the electronic control unit 30 updates the actual motor resistance Rx in the updating process, instead of correcting and updating the resistance map.

While the motor resistance Rm, which is determined using the resistance map, is used to calculate the motor rotational angular velocity $\bar{\omega}m$ in the foregoing example embodiments, the motor resistance Rm may be used for calculations other than that of the motor rotational angular velocity $\bar{\omega}m$.

While the resistance map updating routine is applied to the electric power steering system 1 including a brushed motor as the motor 21 in the EPS actuator unit 20 in the foregoing example embodiments, the resistance map updating routine may be applied also to an electric power steering system including a brushless motor.

While the invention has been applied to the electric power steering system 1 that is a column type electric power steering system in the foregoing example embodiments, the invention may be applied also to, for example, pinion-assist type electric power steering systems and rack-assist type electric power steering systems. In such cases, too, effects that are identical or similar to those of the foregoing example embodiments may be obtained by incorporating the structural features of the foregoing example embodiments or structural features similar or equivalent to those of the foregoing example embodiments into the electric power steering system.

Accordingly, the invention provides electric power steering systems that are capable of minimizing the difference between the actual resistance of a motor used to apply assist force to a steering system and the calculated resistance of the same motor.

What is claimed is:

1. An electric power steering system, comprising
   a motor that applies assist force to a steering system,
   a storage unit within an electronic control unit that stores a resistance map;
   wherein an induced voltage of the motor is calculated as an estimated induced voltage, based on a current of the motor and a voltage of the motor, and a resistance value of the motor, which is set for calculation, is updated when a magnitude of the estimated induced voltage is equal to or smaller than a determination value that is set in accordance with a level of the current of the motor,
   wherein the resistance map defines a relation between the current of the motor and the resistance value of the motor, and
   wherein, when the magnitude of the estimated induced voltage is equal to or smaller than the determination value that is set in accordance with the level of current of the motor, the resistance value of the motor is calculated and the resistance map is updated in the storage unit based on the calculated resistance value of the motor.

2. The electric power steering system according to claim 1, wherein an induced voltage variation representing an amount by which the estimated induced voltage changes with time is calculated, and when the magnitude of the estimated induced voltage is equal to or smaller than the determination value and a magnitude of the induced voltage variation is equal to or smaller than a voltage reference value, the resistance value of the motor, which is set for calculation, is updated.

3. The electric power steering system according to claim 1, wherein a resistance variation representing an amount by which the resistance of the motor changes with time is calculated, and when the magnitude of the estimated induced voltage is equal to or smaller than the determination value and a magnitude of the resistance variation is equal to or smaller than a resistance reference value, the resistance value of the motor, which is set for calculation, is updated.

4. The electric power steering system according to claim 1, wherein the estimated induced voltage is calculated using a disturbance observer that regards the estimated induced voltage as a disturbing factor.

5. The electric power steering system according to claim 2, wherein the estimated induced voltage is calculated using a disturbance observer that regards the estimated induced voltage as a disturbing factor.

6. The electric power steering system according to claim 3, wherein the estimated induced voltage is calculated using a disturbance observer that regards the estimated induced voltage as a disturbing factor.

7. The electric power steering system according to claim 4, wherein the determination value contains a maximum calculation error that is caused by the disturbance observer.

8. The electric power steering system according to claim 5, wherein the determination value contains a maximum calculation error that is caused by the disturbance observer.

9. The electric power steering system according to claim 6, wherein the determination value contains a maximum calculation error that is caused by the disturbance observer.

10. The electric power steering system according to claim 1, wherein when the magnitude of the estimated induced voltage is equal to or smaller than the determination value, the determination value is reduced based on the magnitude of the estimated induced voltage.

11. The electric power steering system according to claim 2, wherein when the magnitude of the estimated induced voltage is equal to or smaller than the determination value, the determination value is reduced based on the magnitude of the estimated induced voltage.

12. The electric power steering system according to claim 3, wherein when the magnitude of the estimated induced voltage is equal to or smaller than the determination value, the determination value is reduced based on the magnitude of the estimated induced voltage.

13. The electric power steering system according to claim 4, wherein when the magnitude of the estimated induced voltage is equal to or smaller than the determination value, the determination value is reduced based on the magnitude of the estimated induced voltage.

14. The electric power steering system according to claim 5, wherein when the magnitude of the estimated induced voltage is equal to or smaller than the determination value, the determination value is reduced based on the magnitude of the estimated induced voltage.

15. The electric power steering system according to claim 6, wherein when the magnitude of the estimated induced voltage is equal to or smaller than the determination value, the determination value is reduced based on the magnitude of the estimated induced voltage.

16. The electric power steering system according to claim 7, wherein when the magnitude of the estimated induced voltage is equal to or smaller than the determination value, the determination value is reduced based on the magnitude of the estimated induced voltage.

17. The electric power steering system according to claim 8, wherein when the magnitude of the estimated induced voltage is equal to or smaller than the determination value, the determination value is reduced based on the magnitude of the estimated induced voltage.

18. The electric power steering system according to claim 9, wherein when the magnitude of the estimated induced voltage is equal to or smaller than the determination value, the determination value is reduced based on the magnitude of the estimated induced voltage.

* * * * *